US011537510B2

(12) United States Patent
Bennett et al.

(10) Patent No.: US 11,537,510 B2
(45) Date of Patent: Dec. 27, 2022

(54) STORAGE DEVICES HAVING MINIMUM WRITE SIZES OF DATA

(71) Applicant: Western Digital Technologies, Inc., San Jose, CA (US)

(72) Inventors: Alan D. Bennett, Edinburgh (GB); Daniel L. Helmick, Broomfield, CO (US); Liam Parker, Edinburgh (GB); Sergey Anatolievich Gorobets, Edinburgh (GB); Peter Grayson, Grand Rapids, MI (US)

(73) Assignee: Western Digital Technologies, Inc., San Jose, CA (US)

( * ) Notice: Subject to any disclaimer, the term of this patent is extended or adjusted under 35 U.S.C. 154(b) by 26 days.

(21) Appl. No.: 16/858,339

(22) Filed: Apr. 24, 2020

(65) Prior Publication Data
US 2021/0334201 A1 Oct. 28, 2021

(51) Int. Cl.
*G06F 12/02* (2006.01)
*G06F 12/0882* (2016.01)
(Continued)

(52) U.S. Cl.
CPC ...... *G06F 12/0246* (2013.01); *G06F 11/1068* (2013.01); *G06F 11/3037* (2013.01);
(Continued)

(58) Field of Classification Search
CPC ............ G06F 12/0246; G06F 12/0882; G06F 11/1068; G06F 11/3037; G06F 13/1668; G06F 2212/7207
See application file for complete search history.

(56) References Cited

U.S. PATENT DOCUMENTS 8,554,997 B1 * 10/2013 Bonwick ............... G06F 3/0611
711/114
9,021,188 B1 * 4/2015 Karamcheti .......... G06F 3/0631
711/103
(Continued)

OTHER PUBLICATIONS

International Search Report and the Written Opinion for International Application No. PCT/US2020/064614 dated Feb. 18, 2021, 9 pages.
(Continued)

*Primary Examiner* — Nanci N Wong
(74) *Attorney, Agent, or Firm* — Patterson & Sheridan, LLP; Steven H. VerSteeg

(57) ABSTRACT

The present disclosure generally relates to methods of operating storage devices. The storage device comprises a controller and a storage unit divided into a plurality of streams. The storage unit comprises a plurality of dies, where each die comprises two planes. One erase block from each plane of a die is selected for stream formation. Each erase block comprises a plurality of wordlines. A stream comprises one or two dies dedicated to storing parity data and a plurality of dies dedicated to storing user data. The stream further comprises space devoted for controller metadata. The storage device restricts a host device to send write commands in a minimum write size to increase programming efficiency. The minimum write size equals one wordline from one erase block from each plane of each die in the stream dedicated to storing user data minus the space dedicated to metadata.

14 Claims, 5 Drawing Sheets

(51) Int. Cl.
    *G06F 11/30*     (2006.01)
    *G06F 13/16*     (2006.01)
    *G06F 11/10*     (2006.01)

(52) U.S. Cl.
    CPC ...... *G06F 12/0882* (2013.01); *G06F 13/1668* (2013.01); *G06F 2212/7207* (2013.01)

(56) References Cited

U.S. PATENT DOCUMENTS

| | | | |
|---|---|---|---|
| 10,950,315 B1* | 3/2021 | Jeon | G06F 9/30101 |
| 11,055,176 B1 | 7/2021 | Helmick et al. | |
| 2007/0183198 A1 | 8/2007 | Otsuka et al. | |
| 2012/0311231 A1 | 12/2012 | Porterfield | |
| 2013/0282980 A1* | 10/2013 | Bennett | G06F 3/0611 |
| | | | 711/114 |
| 2015/0227460 A1* | 8/2015 | Post | G06F 3/061 |
| | | | 713/193 |
| 2016/0092300 A1* | 3/2016 | Lei | G06F 11/1068 |
| | | | 714/764 |
| 2016/0210083 A1* | 7/2016 | Oh | G06F 3/0616 |
| 2016/0291884 A1 | 10/2016 | Halaharivi et al. | |
| 2016/0357462 A1* | 12/2016 | Nam | G06F 3/068 |
| 2018/0024777 A1 | 1/2018 | Higgins et al. | |
| 2018/0137005 A1* | 5/2018 | Wu | G11C 11/4093 |
| 2020/0012444 A1* | 1/2020 | Ko | G06F 3/064 |
| 2020/0379899 A1 | 12/2020 | Gole | |
| 2021/0011639 A1* | 1/2021 | Hatfield | G06F 3/0673 |
| 2021/0011659 A1 | 1/2021 | Koseki et al. | |
| 2021/0042031 A1* | 2/2021 | Ji | G06F 3/0625 |
| 2021/0064290 A1* | 3/2021 | Kanno | G06F 3/0659 |
| 2021/0064520 A1* | 3/2021 | Kanno | G06F 12/1009 |

OTHER PUBLICATIONS

Yoon "Understanding Memory," Semiconductor Engineering, Feb. 15, 2018, https://semiengineering.com/whats-really-happening-inside-memory/.

* cited by examiner

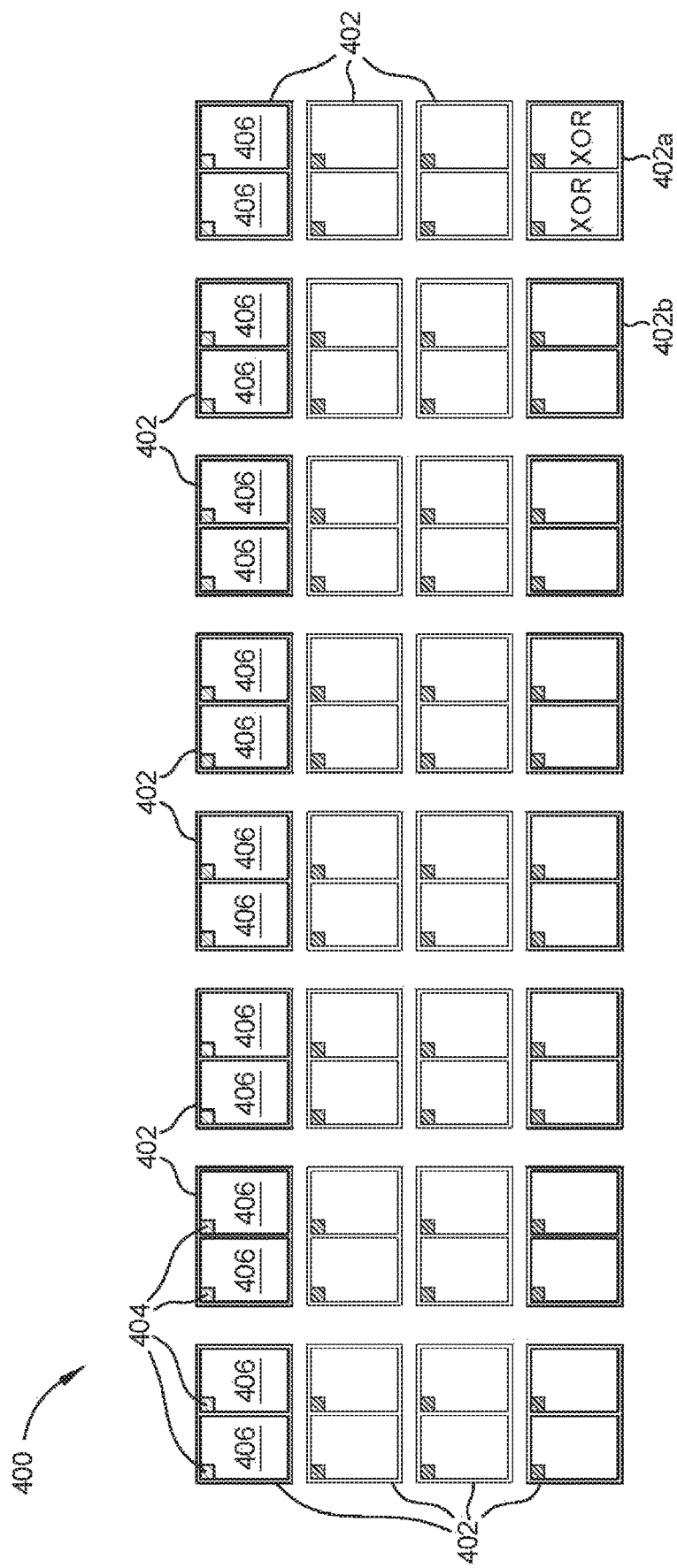

STORAGE DEVICES HAVING MINIMUM WRITE SIZES OF DATA

BACKGROUND OF THE DISCLOSURE

Field of the Disclosure

Embodiments of the present disclosure generally relate to storage devices, such as sold state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data is stored. One or more erase blocks may be grouped together by their respective logical block addresses to form a plurality of streams.

The host device may send write commands of any size to the storage device. The storage device may then write the commands to the memory device as the commands are received, regardless of the size of the commands. However, writing several small commands to the memory device may require a lot of time, slowing down the programming time, and decreasing the overall programming efficiency of the storage device.

Therefore, what is needed is a new method of operating a storage device that optimizes controller resource efficiency to maximize throughput for the storage device.

SUMMARY OF THE DISCLOSURE

The present disclosure generally relates to methods of operating storage devices. The storage device comprises a controller and a storage unit divided into a plurality of streams. The storage unit comprises a plurality of dies, where each die comprises two planes. One erase block from each plane of a die is selected for stream formation. Each erase block comprises a plurality of wordlines. A stream comprises one or more die planes dedicated to storing parity data and a plurality of dies dedicated to storing user data. The stream further comprises space devoted for controller metadata. The storage device restricts a host device to send write commands in a minimum write size to increase programming efficiency. The minimum write size equals one wordline from one erase block from each plane of each die in the stream dedicated to storing user data minus the space dedicated to metadata.

In one embodiment, a storage device comprises a non-volatile storage unit, wherein a capacity of the non-volatile storage unit is divided into a plurality of streams, and wherein the non-volatile storage unit comprises a plurality of dies. Each of the plurality of comprising a plurality of erase blocks, and each of the erase blocks comprising a plurality of wordlines. The storage device further comprises a controller coupled to the non-volatile storage unit. The controller is configured to determine a minimum write size for commands to write data received from a host device, wherein the minimum write size is determined based on a number of erase blocks in a stream dedicated to storing user data, a pages per cell of the wordlines of each erase block, a number of wordlines in each erase block, and an amount of space dedicated to storing metadata of the storage device. The controller is further configured to receive the commands to write data from the host device in the minimum write size, or aggregate one or more smaller commands to write data received from the host device having a size smaller than the minimum write size until the minimum write size is reached.

In another embodiment, a storage device comprises a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines. The storage device further comprises a controller coupled to the non-volatile storage unit. The controller is configured to calculate a minimum write size for commands to write data received from a host device, wherein the minimum write size is calculated to write a full wordline size of one erase block of each plane of each die dedicated to storing user data within a stream. The controller is further configured to restrict the host device through a verbal agreement or a handshake agreement to send the commands to write data in the minimum write size.

In another embodiment, a storage device comprises a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines. The storage device further comprises a means for receiving commands to write data received from a host device in a minimum write size, wherein the minimum write size is set by multiplying a number of erase blocks in a stream dedicated to storing user data times a pages per cell of the wordlines times a wordline size, and subtracting an amount of space dedicated to storing metadata of the storage device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A illustrates a stream comprised of a plurality of erase blocks selected from a plurality of dies, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller and a storage unit divided into a plurality of streams. The storage unit comprises a plurality of dies, where each die comprises two planes. One erase block from each plane of a die is selected for stream formation. Each erase block comprises a plurality of wordlines. A stream comprises one or two dies dedicated to storing parity data and a plurality of dies dedicated to storing user data. The stream further comprises space devoted for controller metadata. The storage device restricts a host device to send write commands in a minimum write size to increase programming efficiency. The minimum write size equals one wordline from one erase block from each plane of each die in the stream dedicated to storing user data minus the space dedicated to metadata.

Figure 1:
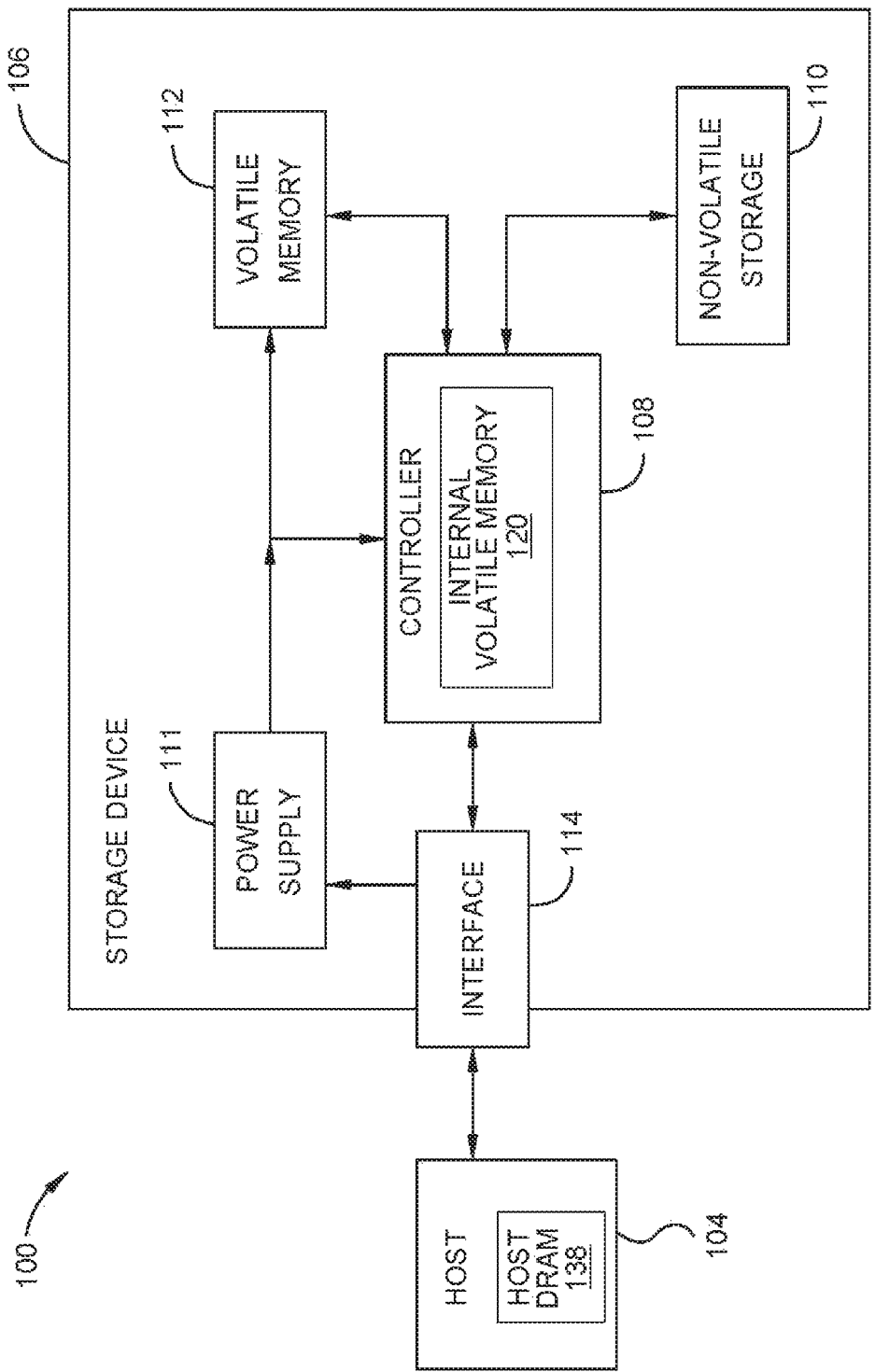
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize non-volatile storage 110, such as non-volatile memory, included in storage device 106 to store and retrieve data. The storage unit 110 may be any type of non-volatile memory, such as MRAM, NAND, NOR, or HDD, for example. In the following descriptions, the storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, non-volatile memory 110 (NVM 110), a power supply 111, volatile memory 112, and an interface 114. The controller 108 comprises an internal volatile memory 120 or buffer. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Computer Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or media units. NVM 110 may be configured to store and/or retrieve data. For instance, a media unit of NVM 110 may receive data and a message from the controller 108 that instructs the media unit to store the data. Similarly, the media unit of NVM 110 may receive a message from the controller 108 that instructs the media unit to retrieve data. In some examples, each of the media units may be referred to as a die. In some examples, a single physical chip may include a plurality of dies (i.e., a plurality of media units). In some examples, each media unit may be configured to store relatively large amounts of data (e.g., 128 MB, 256 MB, 412 MB, 1 GB, 2 GB, 4 GB, 8 GB, 16 GB, 32 GB, 64 GB, 128 GB, 256 GB, 412 GB, 1 TB, etc.).

In some examples, each media unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or media units. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, DDR5, LPDDR5, and the like)).

The various types of volatile memories may be used with different access properties. For example, DRAM may be arranged for longer burst accesses to allow for improved bandwidth (BW) of the same access bus. Alternatively, DRAM may be used with smaller accesses such that random small accesses may have better latency. The controller comprises additional optional SRAM and/or embedded MRAM. Embedded MRAM is another alternative memory that may be used in another embodiment. Similarly, the access to the MRAM can be optimized for different design purposes, but the quantity of embedded MRAM in the SSD controller may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus (not shown). In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal volatile memory 120 before sending the data to the NVM 110.

Figure 2:
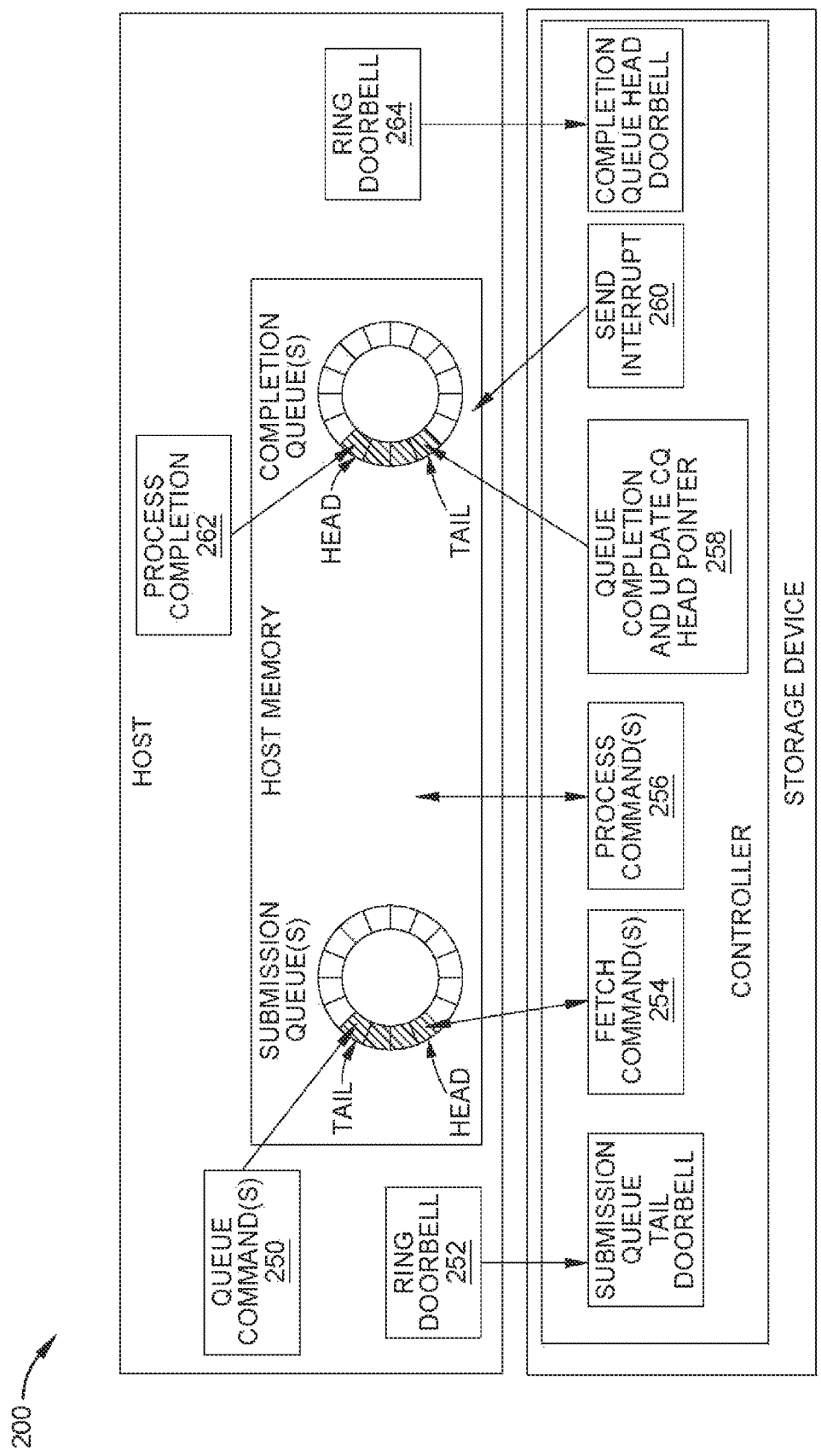
FIG. 2 is a block diagram illustrating a method of operating a storage device to execute a read or write command, according to one embodiment.

FIG. 2 is a block diagram illustrating a method of operating a storage device to execute a read or write command, according to one embodiment. FIG. 2 is a block diagram illustrating a method 200 of operating a storage device to execute a read or write command, according to one embodiment. Method 200 may be used with the storage system 100 having a host device 104 and a storage device 106 comprising a controller 108.

Method 200 begins at operation 250, where the host device writes a command into a submission queue as an entry. The host device may write one or more commands into the submission queue at operation 250. The commands may be read commands or write commands. The host device may comprise one or more submission queues.

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives the command.

In operation 256, the controller processes the command and writes or transfers data associated with the command to the host device memory. The controller may process more than one command at a time. The controller may process one or more commands in the submission order or in the sequential order. Processing a write command may comprise identifying a stream to write the data associated with the command to and writing the data to one or more logical block addresses (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
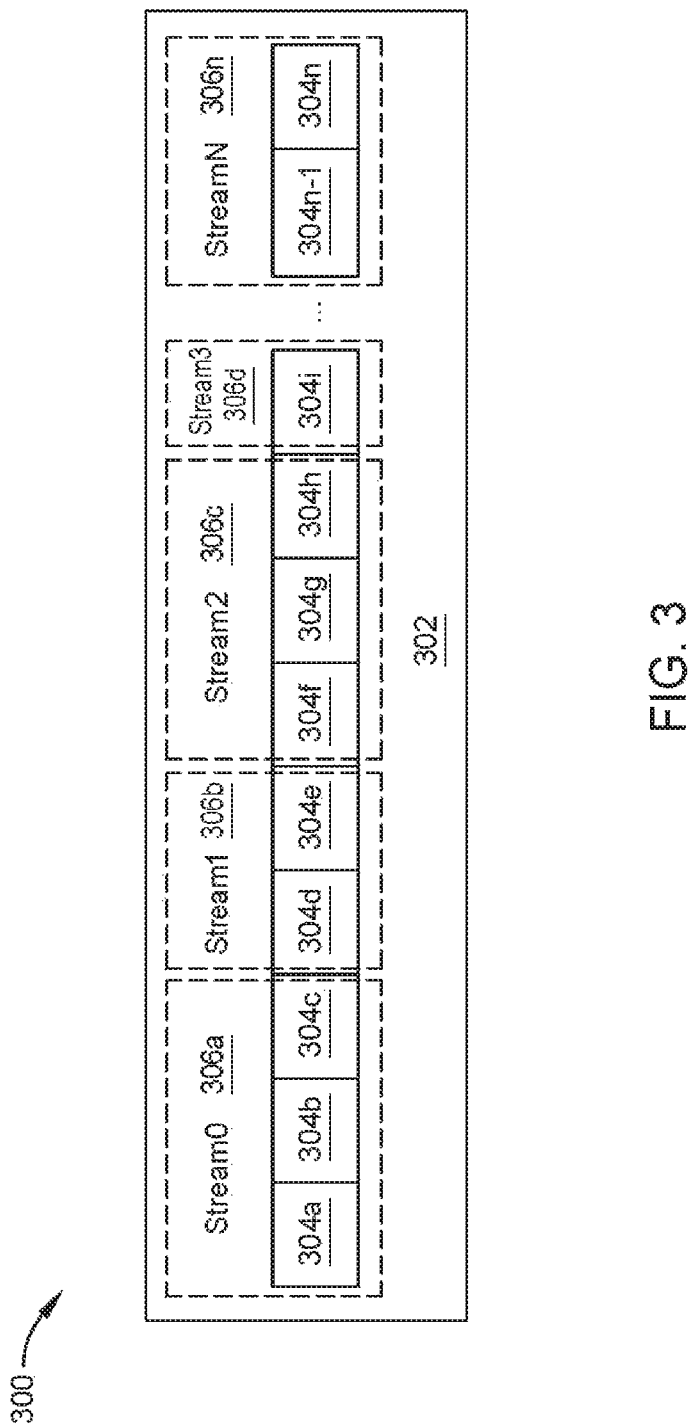
FIG. 3 illustrates of a storage device including a non-volatile storage unit comprising a plurality of dies, according to one embodiment.

FIG. 3 illustrates of a storage device 300 including a non-volatile storage unit 302 comprising a plurality of dies 304a-304n, according to one embodiment. In the following descriptions, the non-volatile storage unit 302 is referred to as a NVM for simplification and exemplary purposes. The NVM 302 may be the NVM 110 of FIG. 1.

In one embodiment, the NVM 302 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

In some embodiments, a NAND location may be equal to a wordline. In such an embodiment, the controller may optionally aggregate several write commands in another memory location such as DRAM or SRAM prior to programming a full wordline composed of multiple write commands. Write commands that are longer than a wordline will be able to program and fill a complete wordline with some of the data, and the excess data beyond a wordline will be used to fill the next wordline. For the purposes of this description, the write data sizes are equal to a NAND location of 512 bytes; however, this is not intended to be limiting.

The capacity of the NVM 302 is divided into a plurality of streams 306a-306n (collectively referred to as streams 306), and each of the streams 306 comprises a plurality of dies 304. The NVM 302 of the storage device can be formatted into logical blocks such that the capacity is divided into a plurality of streams 306. Each of the plurality of streams 306 may have a state that is open and active, open and closed, empty, full, or offline. Moreover, one or more streams 306 of the plurality of streams 306 may have a different size or capacity. For example, a first stream0 306a and a third stream2 306c are each shown to comprise three dies 304, a second stream1 306b and an n$^{th}$ streamN 306n are shown to comprise two dies 304, and a fourth stream3 306d is shown to comprise 1 die 304.

The term "written to" includes programming user data on 0 or more NAND locations in an erase block and/or partially filled NAND locations in an erase block when user data has not filled all of the available NAND locations. The term "written to" may further include moving a stream to full due to internal drive handling needs (open block data retention concerns because the bits in error accumulate more quickly on open erase blocks), the storage device closing or filling a stream due to resource constraints, like too many open streams to track or discovered defect state, among others, or a host device closing the stream for concerns such as there being no more data to send the drive, computer shutdown, error handling on the host, limited host resources for tracking, among others.

Each of the streams 306 comprise a plurality of physical or erase blocks (not shown) of a memory unit or NVM 302, and each of the erase blocks are associated a plurality of logical blocks (not shown). As discussed above, each of the streams 306 may be a different size, and are not required to be aligned to the capacity of one or more erase blocks of a NVM or NAND device. A stream write size (SWS) is an optimal write size agreed on between the host, such as the host 104 of FIG. 1, and the storage device, such as the storage device 106 of FIG. 1. The SWS may be a factory setting of the storage device 300. Write sizes received in sizes less than the SWS may still be written to the relevant stream; however, the write performance may be limited.

When the controller receives a command, such as from a host device (not shown) or the submission queue of a host device, the command is received with a stream ID (e.g., stream0), which tells the controller which stream 306 of the plurality of streams 306 to write the data associated with the command to. The host device may select the stream ID for a command based on data the host device wants grouped together. Thus, the data stored within each stream 306 may be related or grouped together as determined by the host, such as the host 104 of FIG. 1.

Because the host is not restricted to any size granularity, the controller, such as the controller 108 of FIG. 1, in the SSD must be prepared to grow or shrink the capacity allocated to each stream. The controller will select a granularity of one or more EBs. The controller will add units of the granularity of one or more EBs to the stream as more physical capacity is required by the streams. If data is unmapped, deallocated, or trimmed, the controller may choose to erase EBs and return them to the free pool of available EBs for the addition to a stream needing capacity. Further, there may be occasions where stream data is overwritten. Thus, the controller may execute garbage collection within one stream or among several streams concurrently to compact the physical space and reclaim EBs when the free pool is low.

In FIG. 3, each die is composed of two planes (shown in FIG. 4A), and each plane comprises a plurality of erase blocks (not shown). User data may be stored in any die 304a-304n-1 of the non-volatile storage unit 302. At least one die 304n may be dedicated to storing the data in flight, such as unwritten user data received from the host or XOR data or parity data associated with the user data. Unwritten user data may comprise small lengths or amount of data (e.g., less than the size of one or more wordlines) that are stored in a parking location or buffer, such as a region in the SRAM 118, until the aggregated size of the data reaches a minimum size (e.g., the size of one or more wordlines), in which case the unwritten user data is written to the NVM 302. In one embodiment, data in flight may be stored in more than one die 304a-304n. Data in flight may be stored in any of the dies 304a-304n within the NVM 302, and is not limited to being stored in the last die 304n.

FIG. 4A illustrates a stream 400 comprised of a plurality of erase blocks 404 selected from a plurality of dies 402, according to one embodiment. The stream 400 may be a stream of the storage unit 110 of FIG. 1 coupled to the controller 108, or a stream 306 of the storage device 300 of FIG. 3. A storage device, such as the storage device 106 of FIG. 1, is coupled to a storage unit, such as the NVM 110 of FIG. 1, which comprises a plurality of dies 402. While 32 dies 402 are shown, any number of dies may be included. Each die 402 is comprised of a pair of planes 406, and each plane 406 is comprised of a plurality of erase blocks 404.

In one embodiment, a stream 400 is formed by selecting an erase block 404 from each plane 406 of 30 out of the 32 dies 402, and assigning or associating the logical block address corresponding to the erase blocks 404 to the stream 400. The configuration of erase blocks 404 of the stream 400 is an example of one embodiment. In another embodiment, the selected erase blocks 404 for a stream 400 may be non-sequential (i.e., not the same erase block in each plane).

Out of the 32 total dies 402, 30 dies 402 can be utilized to store data, one parity die 402a can be utilized to store parity data (e.g., XOR data, internal error correction codes (ECC), external ECC, etc.), and one parity or user data die 402b can be utilized to store either user data or parity data. In one embodiment, the stream 400 may contain 31 dies 402 to be utilized for user data and 1 die 402a to be utilized for parity data. For example, RAID 4 utilizes 1 die for parity data. In another embodiment, the stream 400 may contain 30 dies 402 to be utilized for user data and 2 dies 402a, 402b to be utilized for parity data. For example, RAID 6 utilizes 2 dies for parity data. Such embodiments are not intended to be limiting nor restricting, and are examples of possible configurations of a stream 400. Furthermore, other embodiments neither listed nor described may exist.

Though referred to throughout as a "parity die", possible embodiments may include a parity plane, where only one plane of a die is associated with parity data. Additionally, parity data for one wordline of each erase block storing user data (e.g., wordline 60 of each erase block of each plane of 30 or 31 dies) may be stored in a corresponding parity wordline (e.g., wordline 60) of any erase block where user data is not being stored in the parity wordline (e.g., wordline 60). In such an embodiment, parity wordlines may be stored in a plurality of different erase blocks, or planes, or dies within the stream 400. Furthermore, when programming to the non-volatile storage unit, a single plane of a die, instead of both planes of a die, may be programmed to the non-volatile storage unit. In the descriptions herein, the embodiments listed to a parity die are applicable to a parity plane or a parity wordline and are not intended to be limiting. Moreover, while the die 402a being utilized to store parity data is shown as the last die 402 within the stream 400, any die 402 may be used to stored parity data.

Within a stream 400, the parity die 402a is partitioned for the storage of parity data for die failure protection. A parity or user data die 402b may either be partitioned for the storage of additional parity data or be utilized for user data. The parity die 402a stores p-parity data, which is the standard parity data. The parity or user data die 402b, when used for parity data, stores q-parity data, which is the same size as the p-parity data. However, the q-parity data is calculated using Gaussian math on the host data stored on a particular wordline of each EB. The parity data includes erasure coding which may protect against single die failure and/or dual die failure. Erasure coding may also provide some amount of protection for plane loss failure.

In coding theory, an erasure code is a forward error correction (FEC) code under the assumption of bit erasures (rather than bit errors), which transforms a message of k symbols into a longer message (code word) with n symbols such that the original message can be recovered from a subset of the n symbols. Examples of various erasure code classes are tornado codes, fountain (i.e., rateless erasure) codes, parity, and Reed-Solomon codes. For example, the Reed-Solomon codes are a group of error-correcting codes (ECC), where the codes are able to detect and correct multiple symbol errors.

In one embodiment, the error correction information used by an ECC decoder to correct errors may refer to redundant and/or encoded bits generated by an encoder for an error correcting code. In various embodiments, an error correcting code may be one of various types of error correcting codes, such as a block code, a convolution code, a Bose-Chaudhuri-Hocquenghem (BCH) code, a low-density parity check (LDPC) code, a Hamming code, a Reed-Solomon code, a turbo code, or the like. In a certain embodiment, the error correcting code may be a systematic error correcting code, so that each ECC chunk, or code word, may store data received by an encoder for the error correcting code, as well as parity bits, or check bits. The ECC may comprise error detecting code (EDC) as well, where the EDC may be a sentinel value, a logical address, a Cyclical Redundancy Code (CRC), or any other ECC miscorrection check that will follow the ECC decode. The miscorrection check detects if the ECC has corrected a value to an invalid result. The miscorrection check is needed because there are instances where no ECC is used, but the EDC still detects for failures.

The stream 400 may have any capacity, such as 256 MiB or 512 MiB. However, a small portion of the stream 400 may be inaccessible to write data to, but may still be read, such as a portion of the stream 400 storing the parity data (e.g., parity die 402a and/or parity or user data die 402b). For example, if the total capacity of a stream 400 is 512 MiB, the writable capacity may be 470 MiB, while 42 MiB are unavailable to write data.

Figure 4B:
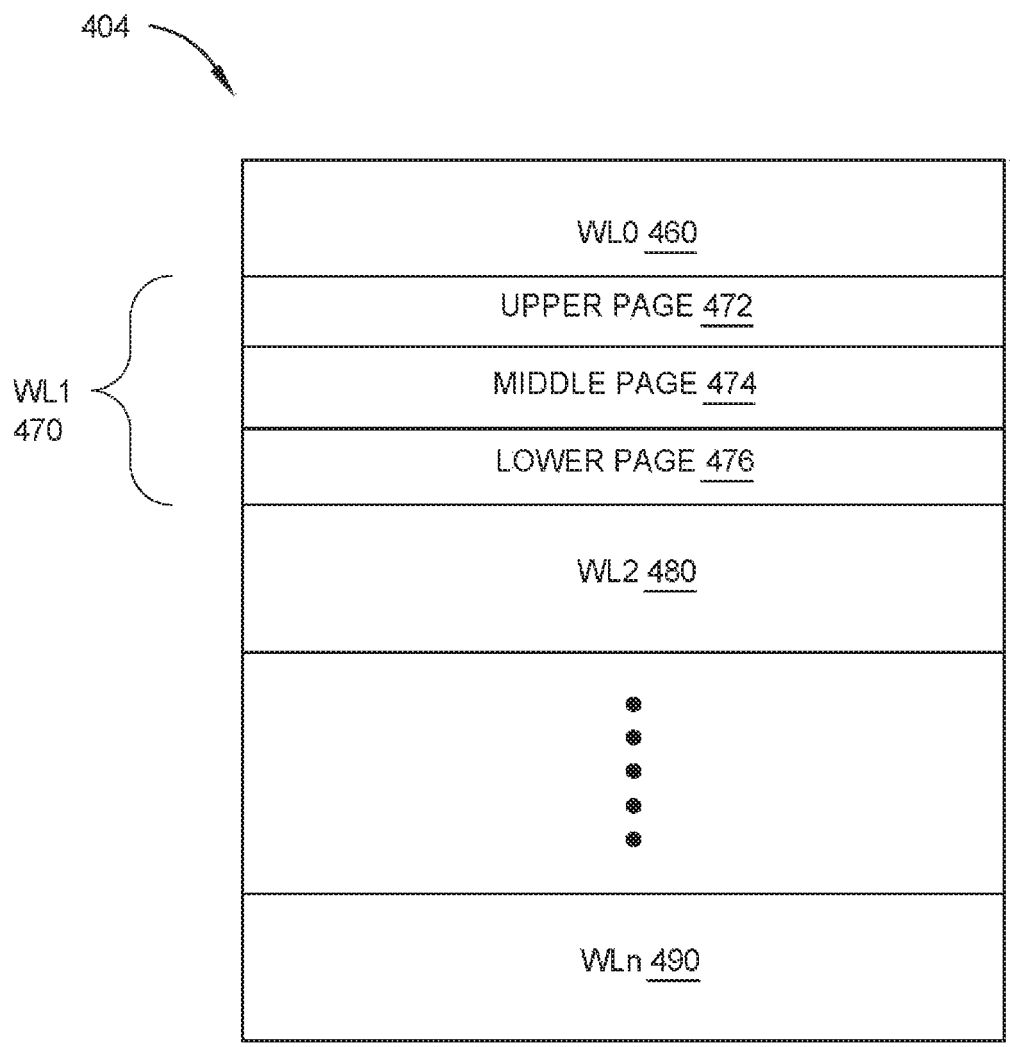
FIG. 4B illustrates an erase block of the stream of FIG. 4A, according to one embodiment.

FIG. 4B illustrates an exemplary erase block 404 of the stream 400 of FIG. 4A, according to one embodiment. FIG. 4B is an example of an erase block 404 in a TLC memory. Other types of memory cells not listed may be applicable to the embodiment, as discussed above. The erase block 404 comprises multiple wordlines, such as WL0 460, WL1 470, WL2 480, and WLn 490. The letter "n" denotes a value applicable to the last wordline within an erase block 404. For example, an erase block 404 may be comprised of 256 wordlines. However, an erase block 404 may be comprised of more than 256 wordlines or less than 256 wordlines.

Furthermore, each wordline is contains a number of pages, where the number corresponds to the type of memory cell. For example, a SLC memory has 1 page per wordline, a MLC memory has 2 pages per wordline, a TLC memory has 3 pages per wordline, and so forth. In FIG. 4B, the erase block 404 is TLC memory, and each wordline comprises an upper page 472, a middle page 474, and a lower page 476, as shown in WL1 470. In the following description, a TLC memory erase block comprising 256 wordlines will be used as an example; however, such an example is for explanatory purposes only and is not intended to be limiting.

The total size of a wordline in a TLC memory in an erase block 404, such as WL1 470, is 48 KiB (i.e., 16 KiB*3 pages). Since two planes exist in a die, a wordline of the same size exists parallel to WL1 (not shown). The combined wordline size of two erase blocks 404, one from each plane 406, in a die 402 (hereafter referred to as "a wordline") is: 1 Die*2 EB/Die*3 page/EB*16 KiB/page=96 KiB, where a single erase block wordline is 48 KiB, which is half the size of a wordline. Furthermore, the die wordline size of 96 KiB and erase block wordline size of 48 KiB may be less due to space dedicated to storing metadata. As such, the total combined size of one wordline in each plane of a die in TLC memory in a die is 96 KiB minus the space dedicated to storing metadata. The previous values are examples of a possible embodiment, and the values listed are neither limiting nor restricting.

A super wordline or a multiple wordline is comprised of a die wordline from each die of a stream (i.e., the sum of one wordline from one erase block from each plane of a die and from each die of a stream storing user data), such that a stream comprises 256 super wordlines, according to one embodiment. In one embodiment, each plane of a die provides one identical erase block (i.e., EB1 of each plane) for a stream. In another embodiment, each plane of a die provides one non-identical erase block (i.e., different erase blocks for each plane) for a stream. For example, if a stream comprises 30 dies dedicated to storing user data, a super wordline would be 96 KiB*30 dies minus the space dedicated to storing metadata in the RAID 6 implementation. Similarly, if a stream comprises 31 dies dedicated to storing user data, a super wordline would be 96 KiB*31 dies minus the space dedicated to storing metadata in the RAID 4 implementation.

In other words, a super wordline capacity for writeable data (i.e., total capacity minus space lost due to controller metadata) for a stream can be solved by the following equation: # Die*2 (EB/Die)*(page/EB)*wordline (WL) size−metadata. Though the term "metadata" is used throughout, metadata may refer to data overhead. Thus, metadata may be used interchangeably with data overhead throughout for exemplary purposes. The metadata may be internal tracking information, such as the stream logical block addresses stored on the super wordline for the storage device. The stream logical block addresses stored on the super wordline comprises the location of the parity data and/or the controller debug information. The super wordline size may be used as a minimum write size for commands to write data received from a host, as discussed below.

For example, for TLC memory (i.e., 3 pages per cell), the super wordline capacity for user data with one die allocated for parity data is solved as follows: 31 Die*2 EB selected/Die*3 page/EB*16 KiB/page−16 KiB=2960 KiB. The 16 KiB/page refers to the WL data size per page within a memory cell. The 16 KiB refers to the metadata data size. The values for WL data size and the metadata data size are merely examples of possible sizes and are not intended to be limiting. In addition, the metadata of a stream may be associated with a single wordline in a single EB, with multiple wordlines in a single EB, or with multiple wordlines across multiple EBs. Furthermore, the metadata may be associated with a portion of a single wordline in a single EB, with a portion of multiple wordlines in a single EB, or with a portion of multiple wordlines across multiple EBs.

Furthermore, the equation is applicable to other forms of memory cells such as SLC, MLC, QLC, and other higher iterations of memory cells. The pages/cell refers to the number of pages a particular type of memory cell may contain. If two dies were allocated for parity data within TLC memory, then the equation would be solved as follows: 30 Die*2 EB/Die*3 page/EB*16 KiB/page−16 KiB=2864 KiB. In a single die 402, two planes 406 exist, and an erase block 404 is selected from each plane 406 for stream formation.

A controller of a storage device, such as the controller 108 of the storage device 106 of FIG. 1, may calculate and set a minimum write size or SWS for commands to write data to one or more streams received from a host. Similarly, the controller and the host may have a verbal agreement or a factory setting for the host to send commands to write data to one or more streams in the minimum SWS. The controller may be configured to communicate the SWS to the host. The minimum write size for commands to write data received from a host for TLC memory may be based on the die WL size of 96 KiB minus the space dedicated to storing metadata so that a combined die WL, such as WL0 460, will be written once to full capacity.

The volatile memory, such as the volatile memory 112 of FIG. 1, may have a region dedicated to storing data in flight, such as unwritten host or user data sent by a host in a size less than the minimum write size that has not been written to NVM 110 and parity data. For example, the volatile memory 112 region may be dedicated to storing write commands comprising less than a wordline of data, equal to one wordline of data, or more than one wordline of data. The host may be restricted to send write commands in a minimum write size through a verbal agreement or a handshake agreement between the host and the controller (e.g., a factory setting) to send write commands in a minimum SWS when writing data to streams, as discussed below. Write commands received to streams less than the SWS may still be written to the relevant location; however, the write performance may be reduced. Unwritten host or user data written to the volatile memory 112 region or the internal volatile memory 120 dedicated to storing data in flight may be aggregated until the minimum write size requirement or the SWS requirement is achieved.

Furthermore, to better optimize the write process and increase programming efficiency, the minimum write size may be selected to fill one wordline in each erase block 404 in a stream 400 (i.e., one die WL in each erase block of the stream is written to simultaneously). Thus, the minimum write size may be set to the super wordline size. In the example in FIG. 4A, where 31 dies 402 (or EB pairs) are for user data and 1 die 402a (or EB pair) is for parity data, about 2960 KiB of data (i.e., 96 KiB*31 user dies) is required to fill a combined die wordline in each of the available dies 402 in a stream 400 to capacity, excluding the space lost to metadata. The minimum write size referenced is not intended to be limiting nor restricting, and other minimum write sizes may exist for other types of memory cells. Moreover, the minimum write size referenced may be larger or smaller than the super wordline size discussed herein, such as two or more die wordlines in each erase block of the stream, or half a die wordline in each erase block of the stream.

In one embodiment, parity data is written to the totality of wordlines of a single erase block of a stream. In another embodiment, parity data is written to one wordline of each erase block, identically (i.e., WL0 of each erase block). In yet another embodiment, parity data is written to one wordline of each erase block, non-identically (i.e., different wordlines on each erase block). In one embodiment, the total number of wordlines dedicated to parity data within a stream is equal to a multiple of one or more erase blocks of a stream.

In one embodiment, the space lost to metadata may be from a wordline. In another embodiment, the space lost to metadata may be from an erase block 404. In yet another embodiment, the space lost to metadata may be from a plane 406. In another embodiment, the space lost to metadata may be from a die 402. In yet another embodiment, the space lost to metadata may be from the stream 400.

For example, the host, such as the host 104 of FIG. 1, stores data to be sent to the storage device, such as the storage device 106 of FIG. 1, until a threshold or minimum write size, is met when restricted to the minimum write size. The threshold may be the super wordline capacity of 2960 KiB previously calculated. When the storage device 106 receives 2960 KiB of data from the host 104, a controller, such as the controller 108, will determine if the data will be sufficient to fill one wordline, such as WL2 480, across each of the dies 402 in a stream 400. If the data received will not fill one wordline across all dies 402 in a stream 400 to capacity, the controller 108 may queue the data write commands until the total aggregate write size stored is sufficient to fill each wordline across all dies 402 in a stream 400 to capacity.

In one embodiment, the minimum write size is a wordline capacity of an erase block 404 minus the space lost to metadata. In another embodiment, the minimum write size is the size of a combined die wordline across two planes 406 of a die 402 minus the space lost to metadata. In yet another embodiment, the minimum write size is the size of a super wordline storing user data in a stream 400 minus the space lost to metadata. In another embodiment, the minimum write size is the size of one or more super wordlines storing user data in a stream 400 minus the space lost to metadata.

If the minimum write size is a wordline of a plane, a buffer may be utilized for each plane and the relevant parity plane. For example, for a two wordline write where each wordline is on parallel planes of a die, four buffers are utilized while the data is located in the internal volatile memory. When one wordline of the plane is written to the non-volatile storage unit (i.e., not a parallel write), two buffers are freed (i.e., returned to the available buffer pool). The freed buffers are a parity buffer associated with the wordline and the wordline buffer. Similarly, if both wordlines are written to the non-volatile storage unit (i.e., a parallel write), all the buffers utilized are returned to the available buffer pool. A parity buffer may be associated with a plane of each die, such that the parity buffer will exist until all identical planes are written to the non-volatile storage unit. When the final utilized plane is written to the non-volatile storage unit, the parity buffer is also written to the non-volatile storage unit, resulting in a non-utilized internal volatile memory.

The write process to a stream may be optimized by writing to a wordline across all dies within a stream concurrently. By restricting the host to have a minimum write size, or allowing the controller to store data until a minimum write size is achieved, such as a size to fill a wordline in each erase block across all dies within a stream to capacity, the overall write performance and programming efficiency may be improved.

In one embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks, and each of the erase blocks comprising a plurality of wordlines. The storage device further comprises a controller coupled to the non-volatile storage unit. The controller is configured to determine a minimum write size for commands to write data received from a host device, wherein the minimum write size is determined based on a number of erase blocks in a stream dedicated to storing user data, a pages per cell of the wordlines of each erase block, a number of wordlines in each erase block, and an amount of space dedicated to storing metadata of the storage device. The controller is further configured to receive the commands to write data from the host device in the minimum write size, or aggregate one or more smaller commands to write data received from the host device having a size smaller than the minimum write size until the minimum write size is reached.

One or more each streams of the plurality of streams comprise the same number of erase blocks and have a same writable capacity. One or more streams of the plurality of streams comprise a different number of erase blocks and have a different writable capacity. The minimum write size is determined to write two full wordlines in each die of the stream minus the amount of space dedicated to storing metadata. Each die of the stream comprises two planes and the minimum write size is determined to write to one full wordline in each plane of each die of the stream minus the amount of space dedicated to storing metadata. A portion of each wordline comprises the amount of space dedicated to storing metadata. A portion of each erase block comprises the amount of space dedicated to storing metadata. Furthermore, at least one die in each stream is dedicated to storing die failure protection data.

In another embodiment, a storage device comprises a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines. The storage device further comprises a controller coupled to the non-volatile storage unit. The controller is configured to calculate a minimum write size for commands to write data received from a host device, wherein the minimum write size is calculated to write a full wordline size of one erase block of each plane of each die dedicated to storing user data within a stream. The controller is further configured to restrict the host device through a verbal agreement or a handshake agreement to send the commands to write data in the minimum write size.

The minimum write size is calculated based on a pages per cell of the plurality of wordlines. A portion of each stream comprises a metadata capacity for the storage device to write to. The minimum write size is calculated to account for the metadata capacity. The controller is further configured to receive one or more write commands from the host device in a size smaller than the minimum write size, hold the one or more write commands until the one or more write commands aggregate to the minimum write size, and write the one or more write commands to the non-volatile storage unit once the one or more write commands are aggregated to the minimum write size. Each stream comprises a plurality of user data dies dedicated to storing user data, a first parity die, and a second parity die. The first parity die is dedicated to storing p-parity data and the second parity die is dedicated to storing q-parity data.

In another embodiment, a storage device comprises a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines. The storage device further comprises a means for receiving commands to write data received from a host device in a minimum write size, wherein the minimum write size is set by multiplying a number of erase blocks in a stream dedicated to storing user data times a pages per cell of the wordlines times a wordline size, and subtracting an amount of space dedicated to storing metadata of the storage device.

The minimum write size is set to align to a size of a wordline. The minimum write size is a factory setting of the storage device. One or more streams of a storage device individually comprises 32 dies, and at least 30 dies of the 32 dies of each of the one or more streams are dedicated to storing user data. Furthermore, at least one die of the 32 dies of each of the one or more streams is dedicated to storing parity data. In addition, a first die of the 32 dies of each of the one or more streams is dedicated to storing p-parity data and a second die of the 32 dies of each of the one or more streams is dedicated to storing q-parity data.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
    a non-volatile storage unit, wherein a capacity of the non-volatile storage unit is divided into a plurality of streams, and wherein the non-volatile storage unit comprises a plurality of dies, each of the plurality of dies comprising a plurality of erase blocks, and each of the erase blocks comprising a plurality of wordlines, wherein each stream comprises a plurality of user data dies of the plurality of dies, a first parity die, and a second parity die, wherein the plurality of user data dies are dedicated to storing user data;
    a volatile storage unit; and
    a controller coupled to the non-volatile storage unit and the volatile storage unit, wherein the controller is configured to:
        store p-parity data in the first parity die;
        store q-parity data in the second parity die, wherein q-parity data is a same size as p-parity data;
        determine a minimum write size for commands to write data received from a host device, wherein the minimum write size is determined based on a number of erase blocks in a stream dedicated to storing user data, a pages per cell of the wordlines of each erase block, a number of wordlines in each erase block, and an amount of space dedicated to storing metadata of the storage device;
        receive the commands to write data from the host device in the minimum write size;
        aggregate one or more smaller commands to write data received from the host device having a size smaller than the minimum write size until the minimum write size is reached, wherein the aggregating occurs within the volatile storage unit; and
        program the write data in the minimum write size to the stream, wherein the programming occurs to a wordline of each erase block of the stream concurrently.

2. The storage device of claim 1, wherein one or more streams of the plurality of streams comprise the same number of erase blocks and have a same writable capacity, and wherein one or more streams of the plurality of streams comprise a different number of erase blocks and have a different writable capacity.

3. The storage device of claim 1, wherein the minimum write size is determined to write two full wordlines in each die of the stream minus the amount of space dedicated to storing metadata.

4. The storage device of claim 3, wherein each die of the stream comprises two planes, and wherein the minimum write size is determined to write to one full wordline in each plane of each die of the stream minus the amount of space dedicated to storing metadata.

5. The storage device of claim 1, wherein a portion of each wordline comprises the amount of space dedicated to storing metadata.

6. The storage device of claim 1, wherein a portion of each erase block comprises the amount of space dedicated to storing metadata.

7. A storage device, comprising:
    a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines, wherein each stream comprises a plurality of user data dies of the plurality of dies, a first parity die, and a second parity die, wherein the plurality of user data dies are dedicated to storing user data;
    a volatile storage unit; and
    a controller coupled to the non-volatile storage unit and the volatile storage unit, wherein the controller is configured to:
        store p-parity data in the first parity die;
        store q-parity data in the second parity die, wherein q-parity data is a same size as p-parity data;
        calculate a minimum write size for commands to write data received from a host device, wherein the minimum write size is calculated to write a full wordline size of one erase block of each plane of each die dedicated to storing user data within a stream;
        restrict the host device through a verbal agreement or a handshake agreement to send the commands to write data in the minimum write size;
        receive one or more write commands from the host device in a size smaller than the minimum write size;
        hold the one or more write commands in the volatile storage unit until the one or more write commands aggregate to the minimum write size; and
        write the one or more write commands to the non-volatile storage unit once the one or more write commands are aggregated to the minimum write size, wherein the writing the one or more write commands to the non-volatile storage comprises programming the aggregated one or more write commands to a wordline of each erase block of the stream concurrently.

8. The storage device of claim 7, wherein the minimum write size is calculated based on a pages per cell of the plurality of wordlines.

9. The storage device of claim 7, wherein a portion of each stream comprises a metadata capacity for the storage device to write to.

10. The storage device of claim 9, wherein the minimum write size is calculated to account for the metadata capacity.

11. A storage device, comprising:
    a non-volatile storage unit, wherein a capacity of the non-volatile storage unit is divided into a plurality of streams, and wherein the non-volatile storage unit comprises a plurality of dies, each of the plurality of dies comprising a plurality of planes, each of the planes comprising a plurality of erase blocks, and each of the erase blocks comprising a plurality of wordlines, wherein each stream comprises a plurality of user data dies of the plurality of dies, wherein the plurality of user data dies are dedicated to storing user data, a first parity die, and a second parity die;

a volatile storage unit;

means for receiving commands to write data received from a host device in a minimum write size, wherein the minimum write size is set by multiplying a number of erase blocks in a stream dedicated to storing user data times a pages per cell of the wordlines times a wordline size, subtracting an amount of space dedicated to storing metadata of the storage device, store p-parity data in the first parity die, and store q-parity data in the second parity die, wherein q-parity data is a same size as p-parity data;

means for aggregating one or more commands to write data received from the host device having a size smaller than the minimum write size, wherein the aggregating occurs within the volatile storage unit; and means for programming the write data in the minimum write size to the stream, wherein the means for programming occurs to a wordline of each erase block of the stream concurrently.

12. The storage device of claim 11, wherein the minimum write size is set to align to a size of a wordline.

13. The storage device of claim 11, wherein the minimum write size is a factory setting of the storage device.

14. The storage device of claim 11, wherein one or more streams individually comprises 32 dies, and wherein at least 30 dies of the 32 dies of each of the one or more streams are dedicated to storing user data.

* * * * *